(12) United States Patent
Nishimura (10) Patent No.: US 8,712,275 B2
(45) Date of Patent: Apr. 29, 2014

(54) IMAGE FORMING APPARATUS WITH ENHANCED DISPLAY OF GUIDANCE INFORMATION

(75) Inventor: Michiaki Nishimura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 134 days.

(21) Appl. No.: 13/426,758

(22) Filed: Mar. 22, 2012

(65) Prior Publication Data

US 2012/0257904 A1  Oct. 11, 2012

(30) Foreign Application Priority Data

Apr. 8, 2011  (JP) .................................. 2011-086221

(51) Int. Cl.
*G03G 21/00*  (2006.01)

(52) U.S. Cl.
USPC .......................................................... 399/81

(58) Field of Classification Search
USPC ...................................... 399/81, 38
See application file for complete search history.

(56) References Cited

U.S. PATENT DOCUMENTS

2007/0009271 A1\*  1/2007  Tanonaka ......................... 399/45
2008/0244402 A1  10/2008  Sakakibara et al. .......... 715/708

FOREIGN PATENT DOCUMENTS

| JP | 2006-015594 | 1/2006 |
| JP | 2006-067066 | 3/2006 |
| JP | 2006-285079 | 10/2006 |
| JP | 2006-323220 | 11/2006 |
| JP | 2008-257345 | 10/2008 |

\* cited by examiner

*Primary Examiner* — Sophia S Chen
(74) *Attorney, Agent, or Firm* — Renner, Otto, Boisselle, Sklar, LLP (57) ABSTRACT

In an image forming apparatus, guidance information is stored in advance for guiding an optimal operation procedure for execution of a job, and the guidance information is displayed on a display portion based on operation input that is input to an input portion in order to execute a job of image formation. For example, a device control portion compares operation input that is input to the input portion in order to execute the job of image formation to the guidance information corresponding to the job executed by the operation input, and causes the display portion to display the guidance information in a case where an actual frequency of operation input is greater than a frequency of operation input that is specified in an operation procedure of the guidance information.

4 Claims, 6 Drawing Sheets

IMAGE FORMING APPARATUS WITH ENHANCED DISPLAY OF GUIDANCE INFORMATION

CROSS-NOTING PARAGRAPH

This non-provisional application claims priority under 35 U.S.C. §119(a) on Patent Application No. 2011-086221 filed in JAPAN on Apr. 8, 2011, the entire contents of which are hereby incorporated herein by reference.

FIELD OF THE INVENTION

The present invention relates to an image forming apparatus, and more particularly to an image forming apparatus capable of displaying operation guidance.

BACKGROUND OF THE INVENTION

An image forming apparatus such as a facsimile, a printer and a copier, or a multi-functional peripheral including a plurality of these functions has been widely used. Among such image forming apparatuses, there is an apparatus which is able to display guidance information in order to help user operation corresponding to a complicated function and a method of setting the same. A user is able to perform desired function setting and the like while confirming the guidance information.

As a technique for helping user operation in an image forming apparatus, for example, Japanese Laid-Open Patent Publication No. 2006-67066 discloses an image forming apparatus in which a usage history of each user is saved in a storage area and the user is specified by information acquired by user information reading means, which is checked with usage history information, so that an operation screen for a beginner is displayed in the case of judging that a current user is a beginner.

In the image forming apparatus in Japanese Laid-Open Patent Publication No. 2006-67066, since a user is judged whether or not to be a beginner based on usage history of the user, even a user with a high frequency of use is not able to perform optimal operation in the case of being unfamiliar with a function included in the image forming apparatus, and it is impossible in the image forming apparatus to display an operation screen for setting the function.

Functions that are included in an image forming apparatus are described in a manual or the like in many cases, however, a recent multifunctional image forming apparatus makes a user difficult to easily recognize all functions.

SUMMARY OF THE INVENTION

An object of the present invention is to provide an image forming apparatus which displays guidance showing an optimal operation method concerning a function actually used by a user, thereby making it possible to display the guidance concerning a function included in the apparatus even for a user who is unfamiliar with the function.

An object of the present invention is to provide an image forming apparatus comprising: an input portion for accepting operation input by a user; an image forming portion for executing a job for performing image formation of image data on a recording medium according to the operation input for the input portion; a storage portion for storing in advance guidance information for guiding an optimal operation procedure for executing the job; a display portion for displaying the guidance information that is stored in the storage portion; and a control portion for controlling display of the display portion, wherein the control portion causes the display portion to display the guidance information based on the operation input that is input to the input portion in order to execute the job for performing the image formation.

Another object of the present invention is to provide the image forming apparatus, wherein the control portion compares the operation input that is input to the input portion in order to execute the job for performing the image formation to the guidance information corresponding to the job that is executed by the operation input, and in a case where an actual frequency of the operation input is greater than a frequency of operation input that is specified in the operation procedure of the guidance information, causes the guidance information to be displayed.

Another object of the present invention is to provide the image forming apparatus, wherein in the input portion, it is possible to perform input operation for a plurality of operation keys, the control portion compares a frequency of operation input for an operation key needed to be operated in order to execute the job to a frequency of operation input for each operation key that is specified in the operation procedure of the guidance information on an operation key basis, and causes the guidance information to be displayed in a case where any of the frequency of the operation input for the operation key is greater than the frequency of the operation input for each operation key that is specified in the operation procedure of the guidance information, or in a case where operation input for the operation key needed to be operated in order to execute the job for performing the image formation is not performed at all.

Another object of the present invention is to provide the image forming apparatus, wherein in the input portion, it is possible to perform input operation for a plurality of operation keys, and the control portion specifies a job to be executed by the image forming portion based on the operation input for the operation key to display the guidance information for executing the specified job.

Another object of the present invention is to provide the image forming apparatus, wherein the display portion is able to display a dedicated screen for setting a specified job, and the control portion specifies a job to be executed by the image forming portion based on the operation input for the operation key to discriminate whether or not the dedicated screen is used at the time of setting the specified job, and in a case where the dedicated screen is not used, causes the display portion to display the guidance information using the dedicated screen.

PREFERRED EMBODIMENTS OF THE INVENTION

Figure 1:
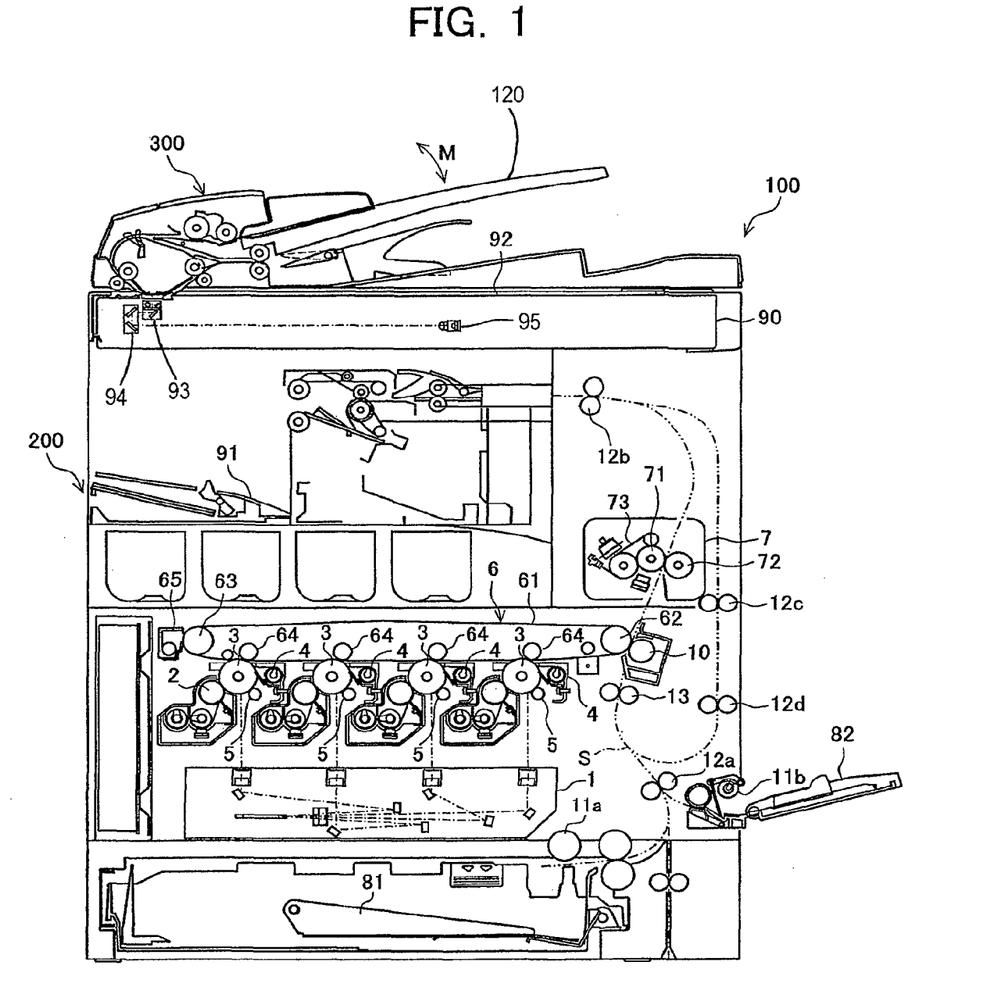
FIG. 1 is a diagram showing a configuration example of an image forming apparatus according to the present invention.

FIG. 1 is a diagram showing a configuration example of an image forming apparatus according to the present invention. An image forming apparatus 100 is configured as a multi-functional peripheral including a facsimile function, a printer function, a copy function, a filing function and the like. A configuration for realizing the facsimile function of the image forming apparatus 100 is equivalent to an embodiment of a facsimile device according to the present invention. Operation of the facsimile function is executed by a panel control portion composed of not-shown operation portion and display portion, and a user sets and calls a phone number on the other side with a numerical keypad or the like of the operation portion so that it is possible to transmit facsimile data. Further, the facsimile data received by the facsimile function is formed as an image on a recording sheet as appropriate.

The image forming apparatus 100 forms a multicolor image and a unicolor image on a recording medium such as a recording sheet according to image data that is transmitted from the outside, and is comprised of a main apparatus 200 and an automatic document processing device 300. The main apparatus 200 is comprised of an optical scanning device 1, developing equipment 2, a photoreceptor drum 3, a cleaner unit 4, a charger 5, an intermediate transfer belt unit 6, a fixing unit 7, a paper feeding cassette 81, a paper discharge tray 91 and the like.

In an upper part of the main apparatus 200, a document platen 92 made of transparent glass on which a document is placed is provided, and the automatic document processing device 300 is mounted on an upper side of the document platen 92. The automatic document processing device 300 automatically feeds a document onto the document platen 92. Additionally, a document processing device 120 is configured so as to rotate freely in an arrow M direction, and the top of the document platen 92 is opened so that it is possible to place a document by hand. The automatic document processing device 300 is connected to the main apparatus 200 with a hinge so that the automatic document processing device 300 is configured to be openable and closable for the main apparatus 200 by rotation of the hinge.

The main apparatus 200 includes image reading means 90 that is contained in a housing. The image reading means 90 is reduced optical system image reading means which is comprised of a light source unit 93 holding a light source and a first mirror, a mirror unit 94 holding a second mirror and a third mirror, a lens and a CCD 95.

Image data which is treated in the image forming apparatus 100 corresponds to a color image using each color of black (K), cyan (C), magenta (M) and yellow (Y). Accordingly, four pieces for each of the developing equipment 2, the photoreceptor drum 3, the charger 5 and the cleaner unit 4 are provided so as to form four types of latent images corresponding to each color, and set to black, cyan, magenta and yellow, respectively, whereby four image stations are constituted.

The charger 5 is a charging means for uniformly charging the surface of the photoreceptor drum 3 to predetermined potential, and for which, contact-type roller type and brush type chargers are used in addition to the charger type as shown in FIG. 1 in some cases.

The optical scanning device 1 is configured as a laser scanning unit (LSU) provided with a laser emission portion, a reflective mirror and the like. In the optical scanning device 1, a polygon mirror that scans by a laser beam, and optical elements such as a lens, a mirror and the like for guiding a laser beam that is reflected by the polygon mirror to the photoreceptor drum 3 are arranged. Additionally, for the optical scanning device 1, it is also possible to employ a method of using, for example, EL and LED writing heads in which light-emitting devices are disposed in an array.

The optical scanning device 1 includes a function for exposing the charged photoreceptor drum 3 according to input image data, thereby, on which surface, forming an electrostatic latent image according the image data. The charger 2 forms the electrostatic latent image that is formed on each of the photoreceptor drum 3 with toners in four colors (YMCK). Further, the cleaner unit 4 removes/collects a toner which remains on the surface of the photoreceptor drum 3 after development and image transfer.

The intermediate transfer belt unit 6 that is arranged on an upper side of the photoreceptor drum 3 is provided with an intermediate transfer belt 61, an intermediate transfer belt driving roller 62, an intermediate transfer belt driven roller 63, an intermediate transfer roller 64 and an intermediate transfer belt cleaning unit 65. Four intermediate transfer rollers 64 described above are provided corresponding to each color for YMCK.

The intermediate transfer belt 61 is stretched out among and rotationally driven by the intermediate transfer belt driving roller 62, the intermediate transfer belt driven roller 63 and the intermediate transfer roller 64. Further, each intermediate transfer roller 64 imparts transfer bias for transferring a toner image of the photoreceptor drum 3 onto the intermediate transfer belt 61.

The intermediate transfer belt 61 is provided in contact with each photoreceptor drum 3, and has a function of sequentially superimposing on and transferring onto the intermediate transfer belt 61 toner images in respective colors that are formed on the photoreceptor drum 3, thereby forming a color toner image (multicolor toner image) on the intermediate transfer belt 61. The intermediate transfer belt 61 is formed in an endless shape with use of, for example, a film with thickness of about 100 μm to 150 μm.

The toner image is transferred from the photoreceptor drum 3 to the intermediate transfer belt 61 by the intermediate transfer roller 64 in contact with a back side of the intermediate transfer belt 61. To the intermediate transfer roller 64, high-voltage transfer bias (high voltage with polarity (+) opposite to charging polarity (−) of a toner) is applied in order to transfer the toner image. The intermediate transfer roller 64 is a roller that is made of metal shaft (for example, stainless-steel) with a diameter of 8 to 10 mm, whose surface is covered with a conductive elastic material (for example, EPDM, urethane form or the like). Such a conductive elastic material enables uniform application in high voltage to the intermediate transfer belt 61. In the present embodiment, a roller shape is used as transfer electrode, however, a brush type or the like is also usable otherwise.

An electrostatic image which is formed on each photoreceptor drum 3 corresponding to each color phase as described above is layered on the intermediate transfer belt 61. In this manner, information of the layered image is transferred on to a sheet by the transfer roller 10 described below that is arranged in a contact position of a sheet and the intermediate transfer belt 61 by rotation of the intermediate transfer belt 61.

At the time, the intermediate transfer belt 61 is brought into pressure-contact with the transfer roller 10 by a predetermined nip, while voltage is applied to the transfer roller 10 in order to transfer a toner to a sheet (high voltage of polarity (+) opposite to a charging polarity (−) of a toner). Further, for the purpose of steadily obtaining the above-described nip by the transfer roller 10, either one of the transfer roller 10 or the above-described intermediate transfer belt driving roller 62 is made of a hard material (metal or the like), and for the other, a soft material such as an elastic roller or the like (an elastic rubber roller, a formable resin roller or the like) is used.

Moreover, as described above, a toner which attaches to the intermediate transfer belt 61 by contact with the photoreceptor drum 3 or a toner which remains on the intermediate transfer belt 61 without being transferred onto a sheet by the transfer roller 10, because of generating a mixed color of toners at next step, is set to be removed/collected by the intermediate transfer belt cleaning unit 65. The intermediate transfer belt cleaning unit 65 is provided with, for example, a cleaning blade as a cleaning member that is in contact with the intermediate transfer belt 61, and the intermediate transfer belt 61 which is in contact with the cleaning blade is supported by the intermediate transfer belt driven roller 63 on the back side thereof.

The paper feeding cassette 81 is a tray for accumulating sheets (recording sheets) to be used for image formation, and provided on a lower side of the optical scanning device 1 of the main apparatus 200. Additionally, the sheets to be used for image formation are also able to be placed in a manual paper feeding cassette 82. Further, the paper discharge tray 91 provided above the main apparatus 200 is a tray for piling up the printed sheet facedown.

Further, the main apparatus 200 is provided with a paper conveyance path S in an approximately vertical shape for feeding sheets in the paper feeding cassette 81 and the manual paper feeding cassette 82 to the paper discharge tray 91 through the transfer roller 10 and the fixing unit 7. Near the paper conveyance path S from the paper feeding cassette 81 or the manual paper feeding cassette 82 to the paper discharge tray 91, pick-up rollers 11a and 11b, a plurality of conveying rollers 12a to 12d, a registration roller 13, a transfer roller 10, the fixing unit 7 and the like are arranged.

The conveying rollers 12a to 12d are small-size rollers for promoting and assisting conveyance of sheets, a plurality of which are arranged along the paper conveyance path S. Further, the pick-up roller 11a is provided near the end of the paper feeding cassette 81, and picks sheets up from the paper feeding cassette 81 sheet by sheet for feeding to the paper conveyance path S. Similarly, the pick-up roller 11b is also provided near the end of the manual paper feeding cassette 82, and picks sheets up from the manual paper feeding cassette 82 sheet by sheet for feeding to the paper conveyance path S.

Furthermore, the registration roller 13 keeps once the sheet conveyed through the paper conveyance path S, and has a function for conveying the sheet to the transfer roller 10 at the time of matching a leading end of a toner image on the photoreceptor drum 3 to a leading end of the sheet.

The fixing unit 7 is provided with a heat roller 71 and a pressurizing roller 72, and the heat roller 71 and the pressurizing roller 72 rotate by holding a sheet therebetween. Additionally, the heat roller 71 is set so as to be at a predetermined fixing temperature by a control portion based on a signal from a not-shown temperature detector, and has a function for bringing with the pressurizing roller 72 a toner into thermocompression bonding to a sheet, thereby applying melting, mixing and pressure-contact to a multicolor toner image that is transferred to the sheet for bringing the sheet into heat fixing. Further, an outer heating belt 73 is provided for heating the heat roller 71 from outside.

Next, a sheet conveyance path will be described. As described above, the image forming apparatus is provided in advance with the paper feeding cassette 81 and the manual paper feeding cassette 82 for containing sheets. In order to feed sheets from these paper feeding cassettes 81 and 82, for each of which, the pick-up rollers 11a and 11b are arranged to guide sheets to the paper conveyance path S sheet by sheet.

The sheet that is conveyed from each of the paper feeding cassettes 81 and 82 is conveyed to the registration roller 13 by the conveying roller 12a of the paper conveyance path S, then conveyed to the transfer roller 10 at the time of matching a leading end of the sheet to a leading end of image information on the intermediate transfer belt 61, in which the image information is written into the sheet. Thereafter, the sheet passes through the fixing unit 7, whereby an unfixed toner on the sheet is melted and fixed by heat, then discharged onto the paper discharge tray 91 through the arranged conveying roller 12b.

The above-described conveyance path is shown at the time of requesting single-sided printing of a sheet, and on the other hand, at the time of requesting double-sided printing, when a rear end of the sheet which passes through the fixing unit 7 after completing single-sided printing as described above is held by the last conveying roller 12b, the sheet is guided to the conveying rollers 12c and 12d by a reverse rotation of the conveying roller 12b. Thereafter, the sheet is discharged to the paper discharge tray 91 through the registration roller 13 after printing is performed on a back surface of the sheet.

Figure 2:
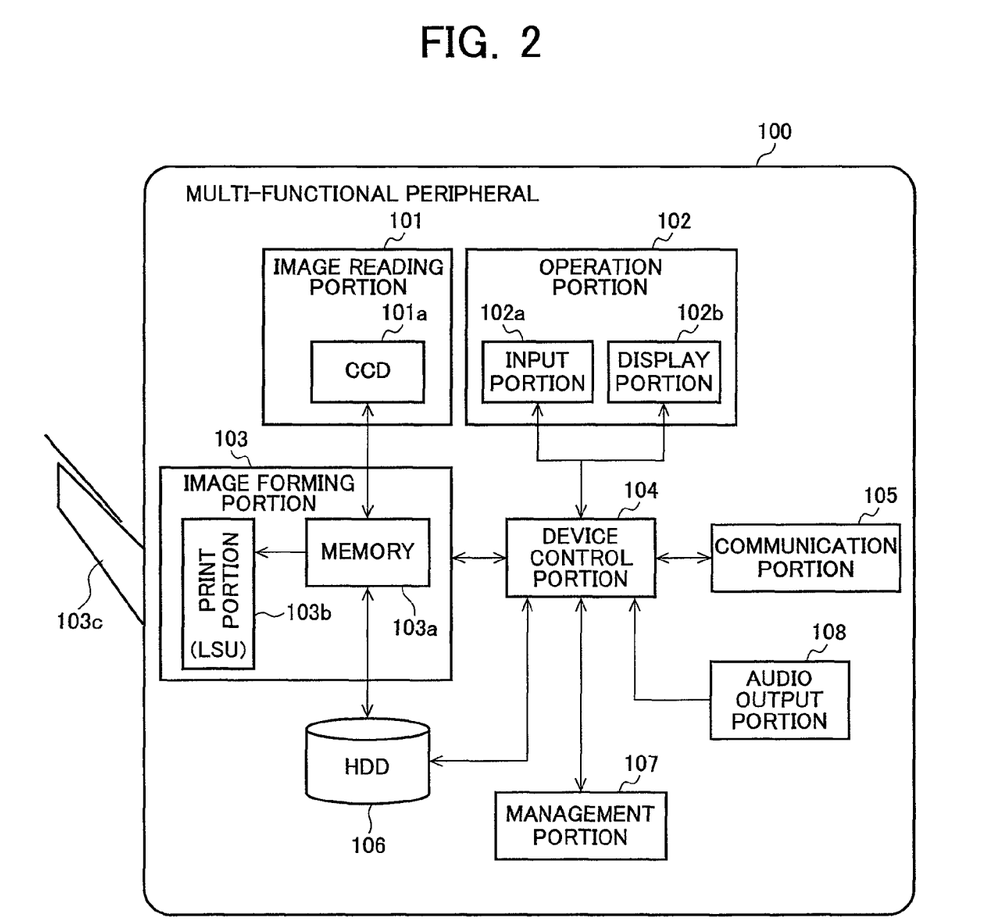
FIG. 2 is a block diagram for explaining a configuration example of an embodiment of the image forming apparatus according to the present invention.

FIG. 2 is a block diagram for explaining a configuration example of an embodiment of the image forming apparatus according to the present invention. The image forming apparatus 100 is provided with a device control portion 104 comprised of a CPU for performing an operation, a RAM for storing temporary information in association with the operation, and the like. The device control portion 104 is equivalent to a control portion of the present invention. The device control portion 104 includes a ROM for storing a control program for controlling the image forming apparatus 100, a RAM as a work area, and the like. In the device control portion 104, guidance information for guiding an optimal operation procedure of the image forming apparatus 100 is stored, while details of user operation for an input portion 102a are temporarily stored so that it is possible to display the guidance information on a display portion 102b based on the details of the user operation. The above-described device control portion 104 corresponds to a storage portion of the present invention for storing the guidance information, however, the guidance information may be stored in another storage means such as a management portion 107 or the like.

Further, to the device control portion 104, the management portion 107 serving as a memory (storage portion) for storing management information (various control information) for managing processing performed by the image forming apparatus 100 and an audio output portion 108 are connected. When the device control portion 104 performs guidance display on the display portion 102b, the audio output portion 108 informs a user of that effect by audio output.

Additionally, to the device control portion 104, an image reading portion 101 is connected for reading an image recorded on a recording sheet to generate image data. The image reading portion 101 is provided with a CCD 101a for capturing a document image as image data.

Further, the device control portion 104 is connected to an operation portion 102 comprised of the input portion (operation input portion) 102a comprised of a touch panel and the like in which information of an instruction from a user and the like is input, and the display portion 102b such as a display panel for displaying information required for operation, change details of setting and the like. On the display portion 102b, a plurality of operation keys are displayed, and a user is able to perform any operation input for the operation key.

Further, to the device control portion 104, an image forming portion 103 is connected for forming an image of image data on a recording medium such as a recording sheet. The image forming portion 103 is provided with a memory 103a for temporarily storing image data, a print portion (LSU) 103b for forming an image from the image data stored by the memory 103a for recording on a recording sheet, and a paper feeding tray 103c for containing recording sheets for image formation at the print portion 103b.

Additionally, the image forming apparatus 100 stores once the image data generated by the image reading portion 101 in the memory 103a, thereafter being capable of forming an image at the print portion 103b. The image data stored once in the memory 103a may be stored in a hard disk (HDD) 106.

A communication portion 105 connects to a network such as a public line network over a phone line and a LAN to serve as a transmission portion and a reception portion for transmitting/receiving information to/from the network. The image forming apparatus 100 is able to receive image data that is transmitted from an information processing device such as a not-shown PC (personal computer) outside at the communication portion 105 for forming an image from the received image data at the image forming portion 103. In this manner, the image forming apparatus 100 serves as a network printer.

According to an embodiment of the image forming apparatus according to the present invention, before executing a job (print job) in the image forming apparatus, details of operation performed by a user for executing the job are stored, and when the job is actually executed, in a case where it is possible to perform setting of a similar job in a simple operation procedure, it is possible to perform guidance display of such an optimal procedure on the operation portion during executing the set job.

This makes it possible to display guidance concerning a function provided in the image forming apparatus even for a user who is unfamiliar with the function.

For example, an operation example of a user will be described when the user sets a magnification and a sheet in execution of a print job.

For example, it is assumed that a user executes the print job for copying a document image (image formation) on a recording sheet in a size different from that of the document. An example of user operation is as follows.

1. A "magnification key" displayed on an initial screen is operated for moving to a screen for setting a magnification.

2. Setting is performed to any desired magnification with a "zoom key" displayed on the screen for setting the magnification, or setting is performed to a fixed magnification that is in advance prepared by a "fixed magnification key". In the case of performing setting of the fixed magnification, for example, when a document is in a B5-size and a read image on which is desired to be scaled to an A4-size recording sheet to form an image, a fixed magnification of "115%" displayed is selected.

3. An "OK" button that is displayed on the screen for setting the magnification is pressed.

4. A paper cassette is selected with a "paper cassette selection key".

5. A "start key" is pressed to start printing. The "start key" serves as a print execution key for executing printing.

Therefore, in the above-described operation, a user performs the operation four times until pressing the start key as the print execution key.

On the other hand, the following description will be given for an operation example in the case of executing the same operation in an optimal procedure. Such a procedure is a procedure which is specified in the guidance information.

1. The "paper cassette selection key" displayed on the initial screen is operated.

2. A "key for automatically setting the magnification" is pressed. The "key for automatically setting the magnification" causes a function to be executed for automatically judging a sheet size of the selected paper cassette and a document size to automatically set the magnification.

3. The "start key" is pressed to start printing.

In this case, this function for automatically setting the magnification is used so that it is possible to execute printing by operation twice without performing key operation four times until performing operation of the start key.

In this manner, in a case where a frequency of key operations (n) by a user is greater than a frequency of key operations (m) required for executing the same function, the image forming apparatus causes the display portion to display guidance showing an optimal procedure of key operation for performing function setting. The displayed guidance makes it possible for a user to know that it is possible to perform the same function setting by performing key operation less frequently.

Figure 3:
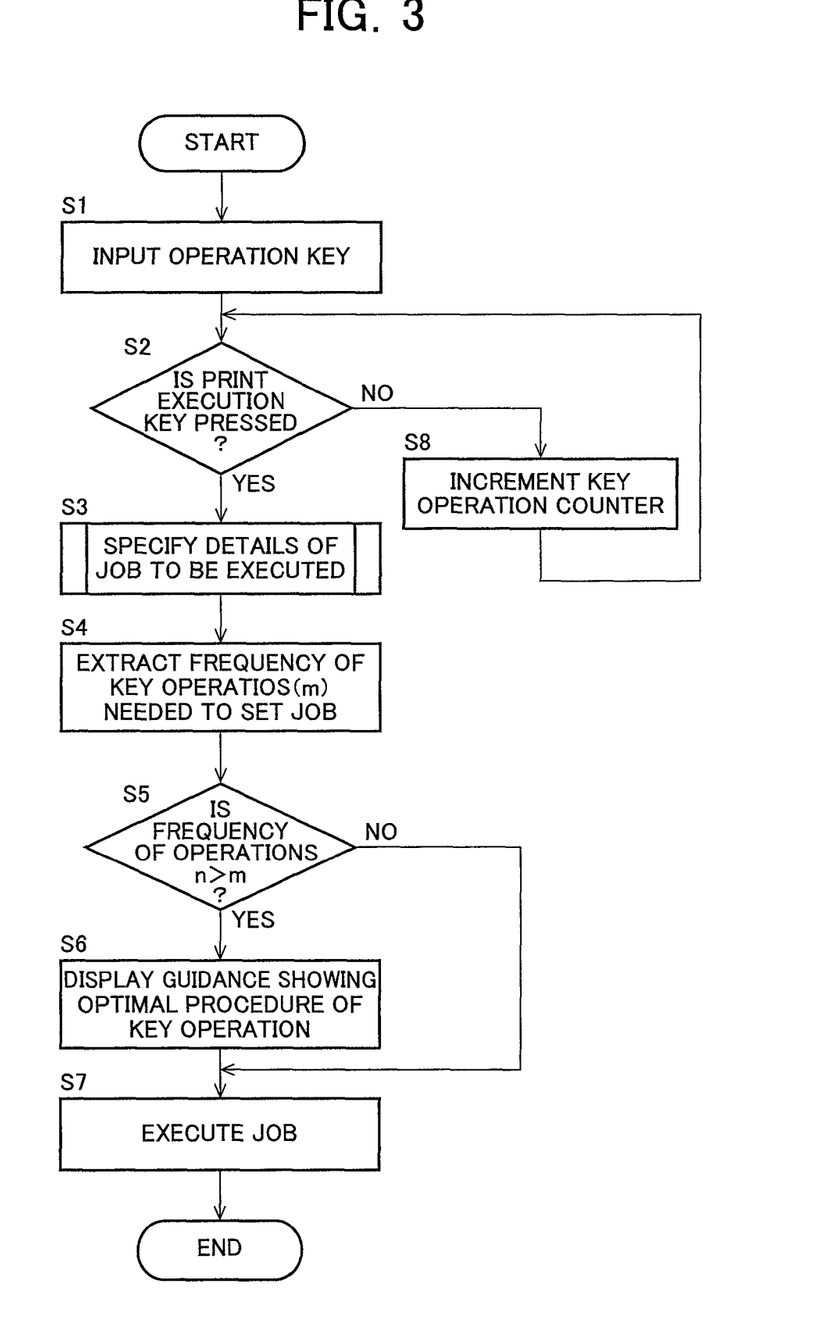
FIG. 3 is a flowchart for explaining an example of processing in the image forming apparatus of the present invention.

FIG. 3 is a flowchart for explaining an example of processing in the image forming apparatus of the present invention, and shows a processing example for performing guidance display by comparison of the above-described frequency of operations.

When input of an operation key is performed for the input portion 102a (step S1), the device control portion 104 discriminates whether or not the input of the operation key is performed by operation of the print execution key (step S2). The print execution key is a key for instructing processing in which specific image data is printed on a recording medium, and corresponds to the above-described start key.

When the input of the operation key is not performed by the operation of the print execution key (step S2—No), the device control portion 104 increments a key operation counter by one (step S8). The key operation counter is intended to count the frequency of key operations (n) in a case where the key operation is not the print execution key. The key operation counter is incremented, thereafter returning the process to step S2 to decide details of next key operation.

At step S2, when the print execution key is operated, the device control portion 104 specifies details of a job to be executed (step S3). Here, the device control portion 104 specifies the job to be executed (for example, print job) corresponding to the details of the key operation performed by a user.

The device control portion 104 then extracts the frequency of key operations (m) required for setting a job corresponding to the specified details of the job (step S4). Information of the required frequency of key operations corresponding to the job is kept as a record in advance in a memory of the device control portion 104 or the like.

The device control portion 104 compares the extracted frequency of key operations m to the frequency of key operations n counted by the key operation counter to discriminate whether to be n>m (step S5). In the case of not being n>m here, the job is executed accordingly (step S7), and the process is finished. On the other hand, in the case of being n>m at step S5, guidance showing an optimal procedure of key operation is displayed (step S6), thereafter executing the job (step S7). The guidance of the optimal procedure is guidance for providing an explanation to a user for key operation to perform function setting by operation m times.

In this manner, the device control portion 104 compares operation input which is input to the input portion 102a in order to execute a job for image formation to guidance information corresponding to a job which is executed by the operation input, and in a case where an actual frequency of operation input is greater than the frequency of operation input which is specified in an operation procedure of the guidance information, causes the guidance information to be displayed on the display portion 102b. This makes it possible to judge that there is a high possibility of lacking knowledge of an operation method and hesitating how to operate when a user operates operation keys a lot of times, and the guidance of the optimal procedure is displayed so that it is possible to enhance an operation efficiency in the case of performing a job of the same setting next time.

Next, as another example of the key operation for performing setting of a print job, an operation example of a user will be described when the user sets a magnification equivalent to a variable magnification fixed by a zoom variable magnification key.

For example, a print magnification of "141%" is set in advance in the image forming apparatus as a fixed magnification in the case of scaling and printing a B5-size document to a B4-size recording sheet and in the case of scaling and printing an A4-size document to an A3-size recording sheet. The magnification equivalent to the fixed magnification is able to be set also with use of a "zoom key".

In this case, an example of user operation is as follows.

1. A user presses 41 times or keeps pushing the "zoom key" for increasing a magnification in order to set to "141%". Pressing 41 times is performed because "100%" is set as initial setting, and the "zoom key" is pressed once, thereby increasing the magnification by 1%. In this case, the fixed variable magnification key is not operated, which operation is thus performed 0 time.

2. The "start key" is pressed to start printing.

In this case, a user performs key operation of the zoom key 41 times or once, however, needs to keep pressing the zoom key a long time to some extent in the case of performing the operation once.

As described above, the image forming apparatus is provided with the "fixed magnification key" for setting a fixed magnification, thus not needing to operate the zoom key 41 times or a long time, and it is possible to perform magnification setting for which a user desires by operating the fixed magnification key of 141%.

In this case, when using this "fixed magnification key", the "fixed magnification key" is operated once as the frequency of key operations (m) until operating the start key without performing key operation 41 times until executing printing as described above.

In this manner, in a case where the frequency of key operations (n) by a user is greater than the frequency of key operations (m) required for executing the same function, the image forming apparatus 100 causes the display portion 102b to display guidance showing an optimal procedure of key operation for function setting. The displayed guidance makes it possible for a user to know that it is possible to perform the same function setting by performing key operation less frequently.

Figure 4:
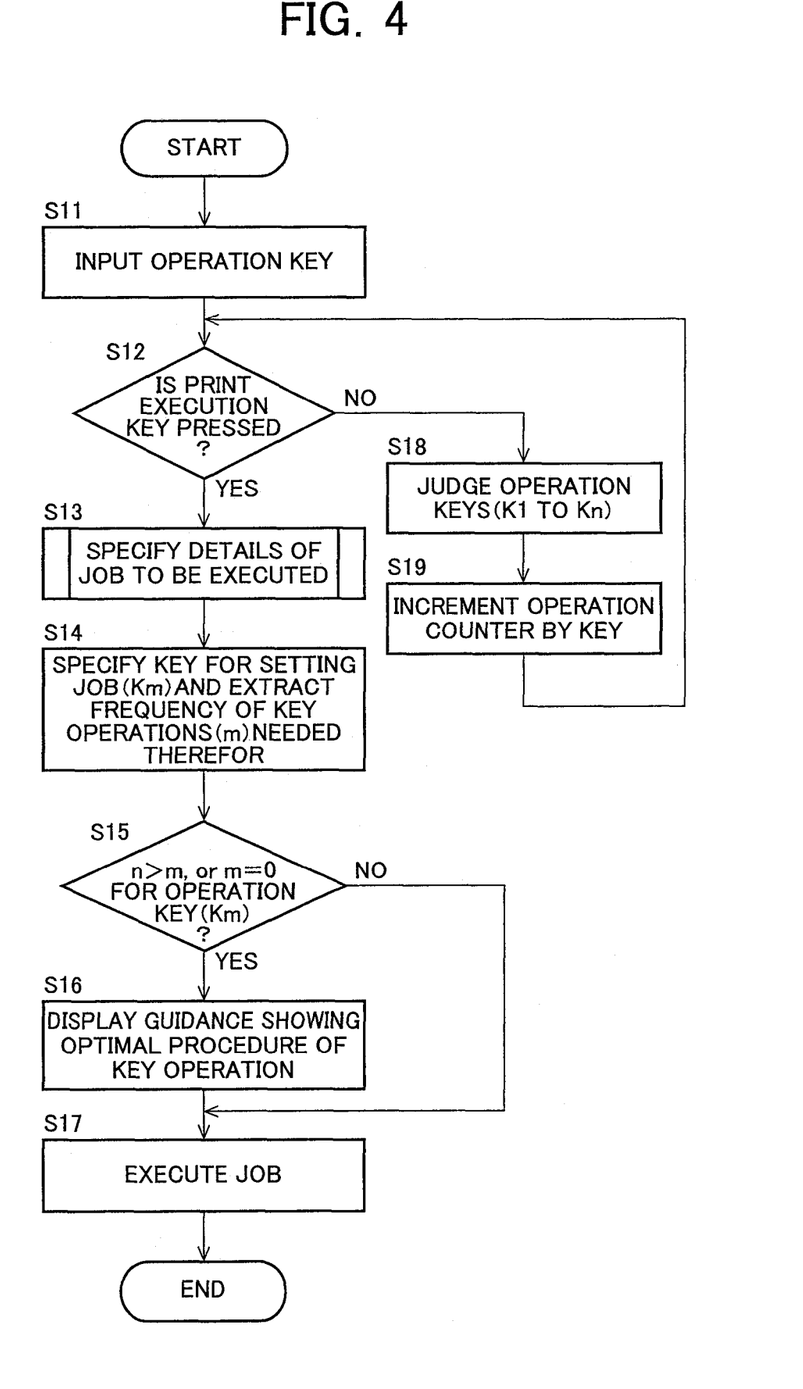
FIG. 4 is a flowchart for explaining another example of the processing in the image forming apparatus of the present invention.

FIG. 4 is a flowchart for explaining another example of the processing in the image forming apparatus of the present invention, and shows another example for performing guidance display by comparison of the above-described frequency of key operations.

When input of an operation key is performed for the input portion 102a (step S11), the device control portion 104 discriminates whether or not the input of the operation key is performed by operation of the print execution key (equivalent to the start key described above) (step S12). In a case where the input of the operation key is not performed by the operation of the print execution key (step S12—No), the device control portion 104 judges the key for which the operation is performed (step S18). Here, for example, it is assumed to judge whether any key of operation keys of k1 to kn is operated.

The device control portion 104 then increments an appropriate counter of an operation counter by key (step S19). The operation counter by key is configured to be able to count the frequency of operations (n) by key discriminated. The operation counter by key is incremented, thereafter returning the process to step S12 to decide details of next key operation.

At step S12, when the print execution key is operated, the device control portion 104 specifies details of an execution job (step S13). Here, the device control portion 104 specifies a job to be executed (for example, print job) corresponding to details of key operation performed by a user.

The device control portion 104 then specifies a key (km) required for setting the specified job corresponding to details of the job to extract the required frequency of operations (m) of the key (step S14). Information of the required key corresponding to the job and the frequency of operations thereof is kept as a record in advance in the management portion 107 or the like.

The device control portion 104 compares, for the specified key (km), the extracted frequency of key operations m to the number of counts of operation n concerning the key (km) counted by the counter by key to discriminate whether to be n>m, or m=0 (step S15). Namely, whether an actual frequency of operations (n) of the operation key (km) is greater than the required frequency of operations (m), or whether the operation key (km) is not operated at all is discriminated.

In the case of not being n>m or m=0 here, the job is executed accordingly (step S17), and the process is finished. On the other hand, in the case of n>m or m=0 at step S15, guidance showing an optimal procedure of key operation is displayed (step S16), thereafter executing the job (step S17).

In this manner, the device control portion 104 compares by operation key a frequency of operation input for an operation key needed to be operated in order to execute a job to a frequency of operation input for each operation key that is specified in an operation procedure of guidance information, and in a case where any frequency of operation input for the operation key is greater than the frequency of the operation input for each operation key that is specified in the operation procedure of the guidance information, or in a case where operation input for the operation key needed to be operated in order to execute an image formation job is not performed at all, causes the guidance information to be displayed.

When the frequency of operation input for the operation key needed to be operated in order to execute a job is greater than the frequency of operations that is specified in the guidance, or in the case of not being operated at all, it is possible to judge that there is a high possibility that a user is unfamiliar with an optimal operation method concerning a specified function, and an optimal procedure is thus displayed with the guidance, thereby making it possible to enhance an operation efficiency in the case of executing a job in the same setting next time.

Next, as still another example of key operation at the time of performing setting of a print job, an operation example of a user will be described when the user copies a book document. When a book document (document that is bound like a book) is read in the image forming apparatus 100 to attempt to perform image formation (printing) by page on one side on a recording sheet in a uniform size, a user needs to perform work such as reading a page on one side of the opened book document, thereafter reading a page on the other side by displacing a position of the book document.

For example, when a page size of the book document is A4 and a read size of a document image is A4, a work procedure of a user is as follows. Here, it is assumed that in the image forming apparatus 100, a sort mode function (electric sort by memory copy) is default.

1. A user sets a book document on a glass surface of a document platen, and sets the number of copies with a "key for setting the number of copies".

2. Then, a "key to start reading" is operated to read a document on a page on one side. In this case, the size of the book document placed on the glass surface of the document platen is A4-size of the page on the one side, and the image forming apparatus 100 detects A4 as a document detection size. A print size is then set to the same magnification as default, thus being set to A4 the same as the document detection size.

3. The user then displaces a position of the book document to read a document on the page on the other side by operating the "key to start reading" again. At the time, since the document in size of A4×2=A3 is placed on the glass surface of the document platen in order to read a document on the page on the other side, the document detection size is A3, however, the print size is A4 the same as an original print size.

4. In the case of finally operating the "start key", it is possible to print images in the A4-size of two sheets which are read by page on one side.

In this case, the user performs operation until operating the print execution key three times with the "key for setting the number of copies", the "key to start reading", and the "key to start reading" after replacing the document. In this case, the user needs to perform cumbersome work for displacing the position of the book document each time a page on one side is printed.

In the image forming apparatus 100, at the time of executing a print job, there are two types of the document detection size when setting the job, one size of which is twice as much as the other size, and in a case where document images in these sizes are formed (printed) on a recording sheet in a uniform size, it is possible to expect that the book document is read.

Here, in the image forming apparatus, in a case where a function (special function) is included for reading the book document placed on the document platen as a document image covering two pages as they are, it is possible to display guidance for setting the function. Further, in reading operation of the document image, in the case of one type of the document detection size, it is possible to judge that an automatic document feeder is not used, thus displaying guidance for using the automatic document feeder.

An optimal procedure to be displayed in guidance is as follows, for example.

1. A book document is set on the document platen.
2. The number of copies is set with the "key for setting the number of copies".
3. A "special function key" is pressed for setting a special function. It is possible to set the following "2 copies in 1 set" by pressing the "special function key".

4. The "key of 2 copies in 1 set" is pressed. The "key of 2 copies in 1 set" is a key for sequentially copying a document on each of both sides while the book document is kept placed on the document platen.

5. The start key is finally operated to execute printing.

Operation of keys is performed until operating the start key that is a print execution key three times, that is, the "key for setting the number of copies", the "special function key" and the "key of 2 copies in 1 set" are operated.

In this manner, in operation in which the special function key is not used, a user operates keys three times until pressing the print execution key, however, needs to perform a cumbersome action for replacing a position of a document. Whereas, in operation in which the special function key is used, key operation is performed three times likewise, however, it does not need to perform an action for replacing the position of the document. A procedure in which the special function key is used is displayed by the guidance.

Figure 5:
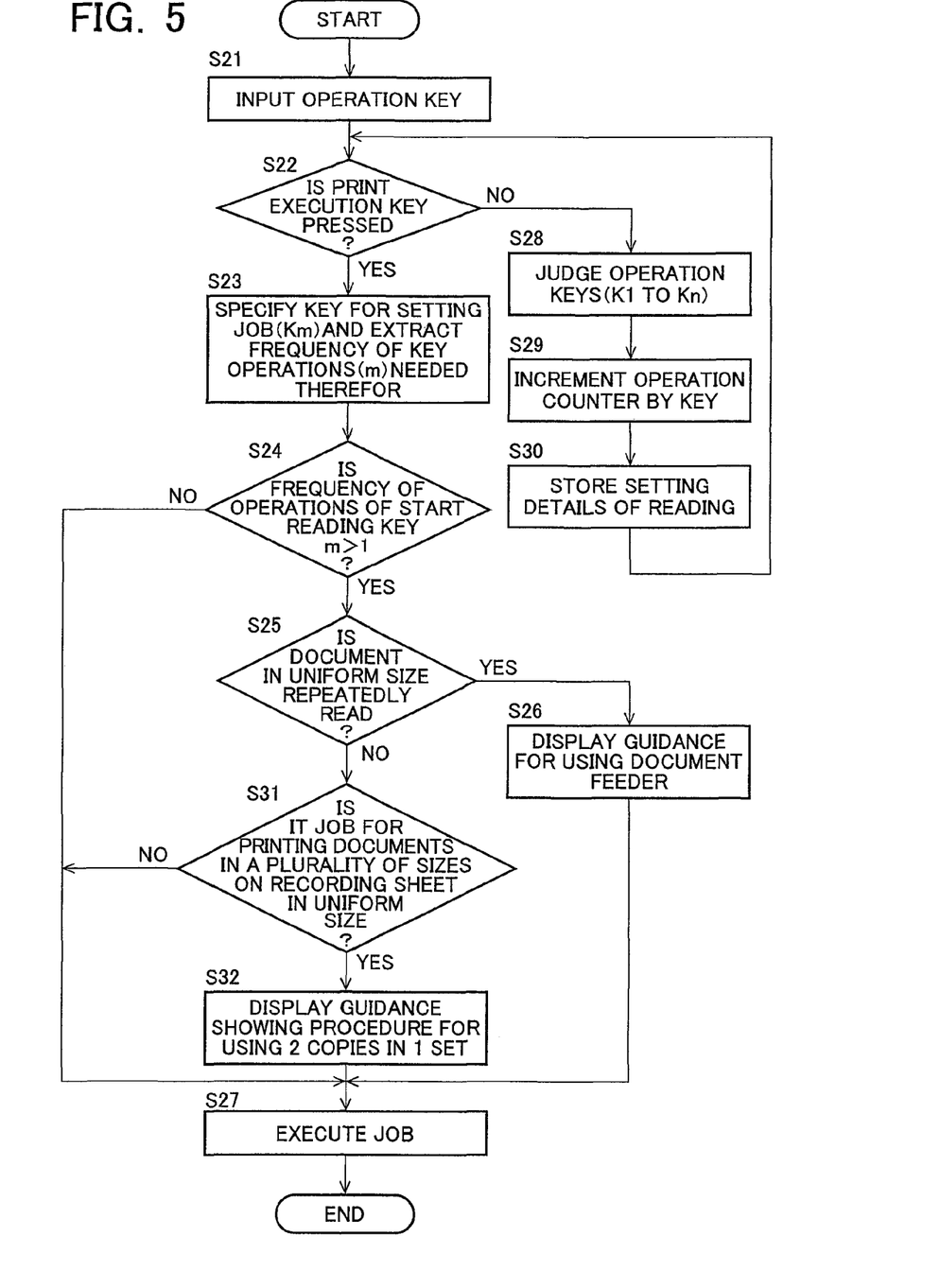
FIG. 5 is a flowchart for explaining still another example of the processing in the image forming apparatus of the present invention.

FIG. 5 is a flowchart for explaining still another example of the processing in the image forming apparatus of the present invention. When input of an operation key is performed for the input portion 102a (step S21), the device control portion 104 discriminates whether or not the input of the operation key is performed by operation of the print execution key (equivalent to the start key described above) (step S22). In a case where the input of the operation key is not performed by the operation of the print execution key (step S22—No), the device control portion 104 judges the key for which the operation is performed (step S28). Here, for example, it is assumed to judge which key of the operation keys, k1 to kn, is operated.

The device control portion 104 then increments an appropriate counter of the operation counter by key (step S29). The operation counter by key is configured to be able to count the frequency of operations (n) by key discriminated.

Next, setting details of reading are stored (step S30). The setting details of reading refer to various types of setting required for reading of a document, and refer to, for example, setting details of image concentration, whether or not to perform double-sided print, a state of a printout, a document size, a variable magnification and the like. When a key for changing the setting details is pressed, it needs to store the setting details in a work memory or the like.

Subsequently, the process returns to step S22 to judge details of next key operation.

At step S22, when the print execution key is operated, the device control portion 104 specifies the key (km) required for setting a job corresponding to details of the job to extract the required frequency of operations (m) of the key (step S24). Information of the required key corresponding to the job and the frequency of operations thereof is kept as a record in advance in the management portion 107 or the like.

Next, the device control portion 104 judges whether or not the frequency of operations m of the key to start reading is m>1 (step S25). That is, here, the key to start reading is pressed a plurality of times, thereby judging whether or not reading operation of a plurality of documents is performed. In the case of being m>1, the reading operation of a plurality of documents is performed.

In the case of not being m>1 at step S24, a job is executed accordingly (step S27), and the process is finished.

On the other hand, in the case of being m>1, judgment is further made on whether or not to repeatedly read the document in a uniform size (step S25). In the case of repeatedly reading the document in the uniform size here, guidance is displayed for using a document feeder (step S26). That is, in the case of repeatedly reading the document in the uniform size, it is believed that a document is placed on the document platen sheet by sheet to perform reading of a document image without using the document feeder, thus displaying the guidance of the document feeder to prompt a user to use a simpler document feeder.

At step S25, in the case of not repeatedly reading the document in the uniform size, the device control portion 104 judges whether or not to be a job for printing documents in a plurality of sizes on a sheet in a uniform size (step S31). That is, judgment is made on whether to be a job for printing a book document on a recording sheet in the uniform size by page on one side. In this case, since a user performs reading of an image for each page on one side displacing a position of the book document, a document size that is automatically detected changes each time a page on one side is printed, and the size of the recording sheet is uniform.

In the case of the job for printing the documents in a plurality of sizes on the sheet in the uniform size, it is judged that it is possible to execute printing for which a user desires by the function of "2 copies in 1 set" as the special function, thus displaying guidance showing a procedure in which "2 copies in 1 set" is used (step S32). Additionally, in the case of not being the job for printing the document in a plurality of sizes on the sheet in the uniform size, the job is executed accordingly (step S27), and the process is finished.

In this manner, the device control portion 104 specifies a job to be executed based on operation input for an operation key of the input portion 102a to display guidance information for executing the specified job. This makes it possible to appropriately execute guidance display and enhance an operation efficiency of a user.

Next, as still another example of the key operation for performing setting of the print job, an operation example of a user will be described when the user continuously copies documents in various sizes.

For example, a work procedure of a user who performs reading and printing of placed documents in which a document in an A4-size and a document in an A3-size are mixed is as follows.

1. A user first sets a document in the A3-size on the glass surface of the document platen, and sets the size of a recording sheet to A3 with the "paper cassette selection key".

2. The "key to start reading" is pressed to read the document.

3. Then, the user sets a document in the A4-size on the glass surface of the document platen, and sets the size of the recording sheet to A4 with the "paper cassette selection key".

4. The "key to start reading" is then operated to read the document.

5. The above-described work of 3 and 4 are repeated according to the number of the placed documents in mixed sizes, however, it is assumed to read two sheets of documents in the A4-size and the A3-size for simplifying explanation here. Then, in the case of finally operating the "start key", it is possible to print images in the A4-size and the A3-size.

In this case, the user performs operations until operating the print execution key four times, that is, the user operates the "paper cassette selection key" and the "key to start reading", as well as the "paper cassette selection key" and the "key to start reading" after replacing the document. In this manner, the user needs to perform operation for selecting a paper cassette each time the document size is changed.

In the image forming apparatus, when a function (special function) is included for detecting, even in the case of a document in various sizes, the size of the document to perform printing by selecting a recording sheet suitable for the document size, it is possible to display guidance for setting the function.

An optimal procedure to display in such guidance is as follows, for example.

1. The "special function key" is pressed for setting the special function. The "special function key" is pressed, thereby displaying a dedicated screen of the special function, so that it is possible to set the following printing of document in mixed sizes.

2. A "key for setting mixed document sizes" is pressed on the dedicated screen. The "key for setting mixed document sizes" is a key for detecting the size of a document to perform printing on a recording sheet suitable for the document, continuously feeding a group of placed documents in various sizes by means of the document feeder.

3. Documents in various sizes are set in the document feeder to execute printing by operating the print execution key.

Key operation until operating the print execution key is performed twice, that is, the "special function key" and the "key for setting mixed document sizes" are operated, and it does not need to operate the "paper cassette selection key" each time the document size is changed. A procedure in which the special function key is used is displayed in the guidance.

Figure 6:
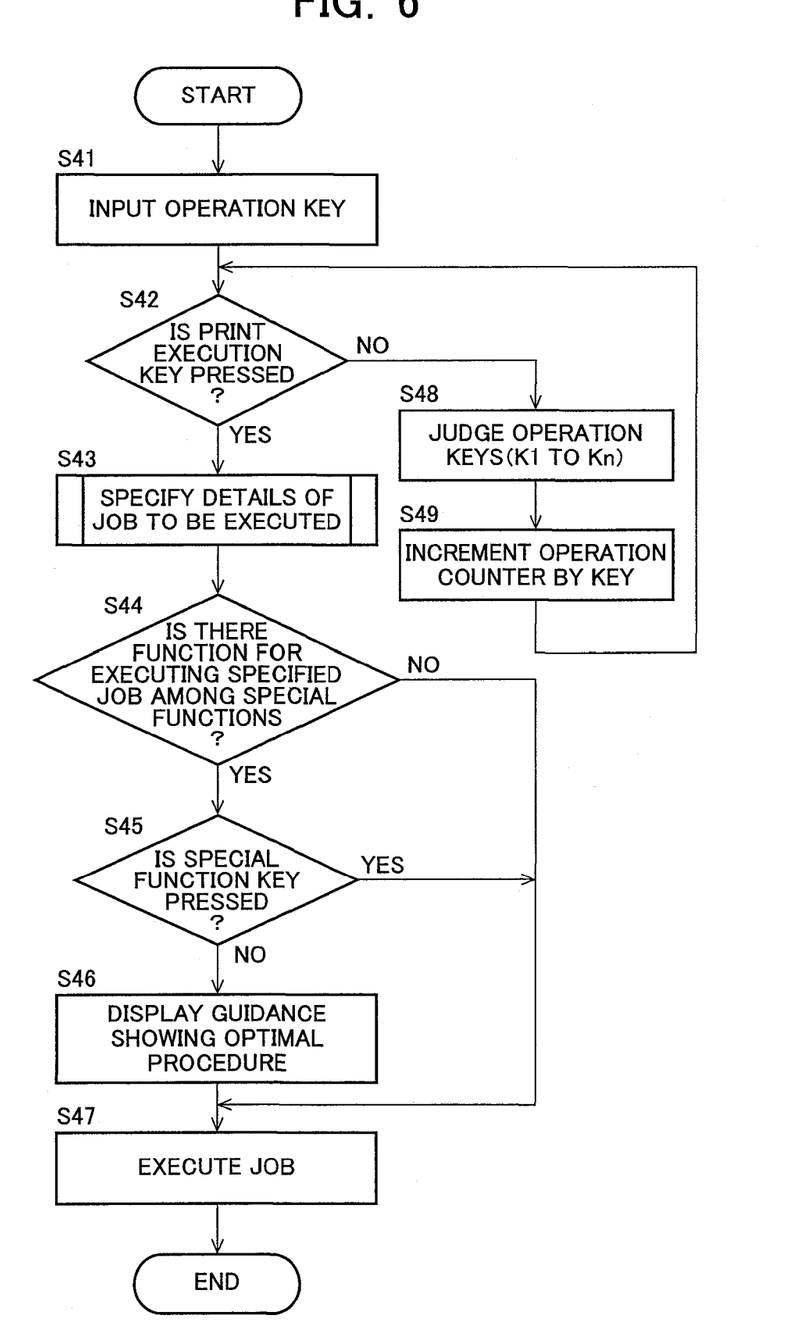
FIG. 6 is a flowchart for explaining still another example of the processing in the image forming apparatus of the present invention.

FIG. 6 is a flowchart for explaining still another example of the processing in the image forming apparatus of the present invention, and shows an example for displaying guidance depending on whether or not the above-described dedicated screen of the special function is used.

When input of an operation key is performed for the input portion 102a (step S41), the device control portion 104 discriminates whether or not the input of the operation key is performed by operation of the print execution key (step S42). In a case where the input of the operation key is not performed by the operation of the print execution key (step S42—No), the device control portion 104 judges the key for which the operation is performed (step S48). Here, for example, it is assumed to judge which key of the operation keys of k1 to kn is operated.

The device control portion 104 then increments an appropriate counter of the operation counter by key (step S49). The operation counter by key is configured to be able to count the frequency of operations (n) by key discriminated. Thereafter, the process returns to step S42 to judge details of next key operation.

At step S42, when the print execution key is operated, the device control portion 104 specifies details of an execution job (step S43). Here, the device control portion 104 specifies a job to be executed corresponding to details of key operation performed by a user.

The device control portion 104 then judges whether or not there is a function for executing the specified job among special functions prepared in the image forming apparatus (step S44). Then, when there is the special function for executing the job, a key for setting the special function is discriminated whether or not to be pressed with reference to the operation counter by key (step S45). It is possible to set the special function on the dedicated screen. In a case where the special function key is pressed, the job is executed accordingly (step S47), and the process is finished.

On the other hand, in a case where the special function key is not pressed, guidance showing an optimal procedure is displayed (step S46). The guidance guides to performing setting of mixed document sizes with use of the special function.

In this manner, the device control portion 104 specifies a job based on operation input for an operation key to discriminate whether or not the dedicated screen of the specified function that is prepared as the special function at the time of setting the specified job is used, and in a case where the dedicated screen is not used, causes the display portion 102b to display guidance information for using a setting screen. This makes it possible to execute user operation effectively.

Further, in the above-described embodiment, the device control portion 104 may display a current progress status of a job during displaying the guidance information for the display portion 102b. As described above, the guidance information is able to be displayed during executing a job by pressing the print execution key. At the time, a progress status of the job is displayed during displaying the guidance. Thereby, for example, in a case where a user uses the image forming apparatus only once and the same user does not execute the same job, or in a case where a user does not need display of guidance information, it is possible to confirm a current status of the job on the display portion 102b.

Further, the device control portion 104 is able to cause the audio output portion 108 to give audio information of displaying the guidance information when the guidance information is displayed on the display portion 102b. For example, when a user does not know a display function of the guidance information included in the image forming apparatus, in the case of a job for discharging a large amount of recording sheets or the like, since there is a possibility that the user leaves the image forming apparatus right after executing the job and may not recognize the guidance information, display of the guidance information is informed by audio output, thereby making it possible for the user to surely confirm the guidance information.

As described above, according to the present invention, guidance is displayed showing an optimal operation method concerning a function that is actually used by a user, thereby making it possible to display guidance concerning a function included in the apparatus even for the user who is unfamiliar with the function.

The invention claimed is:

1. An image forming apparatus comprising:
an input portion for accepting operation input by a user;
an image forming portion for executing a job for performing image formation of image data on a recording medium according to the operation input for the input portion;
a storage portion for storing in advance guidance information for guiding an optimal operation procedure for executing the job;
a display portion for displaying the guidance information that is stored in the storage portion; and
a control portion for controlling display of the display portion, wherein
the control portion causes the display portion to display the guidance information based on the operation input that is input to the input portion in order to execute the job for performing the image formation; wherein
the control portion compares the operation input that is input to the input portion in order to execute the job for performing the image formation to the guidance information corresponding to the job that is executed by the operation input, and
in a case where an actual frequency of the operation input is greater than a frequency of operation input that is specified in the operation procedure of the guidance information, causes the guidance information to be displayed.

2. The image forming apparatus as defined in claim 1, wherein
in the input portion, it is possible to perform input operation for a plurality of operation keys, and
the control portion specifies a job to be executed by the image forming portion based on the operation input for the operation key to display the guidance information for executing the specified job.

3. An image forming apparatus comprising:
an input portion for accepting operation input by a user;
an image forming portion for executing a job for performing image formation of image data on a recording medium according to the operation input for the input portion;
a storage portion for storing in advance guidance information for guiding an optimal operation procedure for executing the job;
a display portion for displaying the guidance information that is stored in the storage portion; and
a control portion for controlling display of the display portion, wherein
the control portion causes the display portion to display the guidance information based on the operation input that is input to the input portion in order to execute the job for performing the image formation; wherein
in the input portion, it is possible to perform input operation for a plurality of operation keys,
the control portion compares a frequency of operation input for an operation key needed to be operated in order to execute the job to a frequency of operation input for each operation key that is specified in the operation procedure of the guidance information on an operation key basis, and
causes the guidance information to be displayed in a case where any of the frequency of the operation input for the operation key is greater than the frequency of the operation input for each operation key that is specified in the operation procedure of the guidance information, or in a case where operation input for the operation key needed to be operated in order to execute the job for performing the image formation is not performed at all.

4. An image forming apparatus comprising:
an input portion for accepting operation input by a user;
an image forming portion for executing a job for performing image formation of image data on a recording medium according to the operation input for the input portion;
a storage portion for storing in advance guidance information for guiding an optimal operation procedure for executing the job;
a display portion for displaying the guidance information that is stored in the storage portion; and
a control portion for controlling display of the display portion, wherein
the control portion causes the display portion to display the guidance information based on the operation input that is input to the input portion in order to execute the job for performing the image formation; wherein
the display portion is able to display a dedicated screen for setting a specified job, and
the control portion specifies a job to be executed by the image forming portion based on the operation input for an operation key to discriminate whether or not the dedicated screen is used at the time of setting the specified job, and in a case where the dedicated screen is not used, causes the display portion to display the guidance information using the dedicated screen.

* * * * *